LAWRENCE NUSSER
ADRIAN J. GOOD
INVENTORS

BY G. G. Christensen

ATT'Y

United States Patent Office 3,463,754
Patented Aug. 26, 1969

3,463,754
COATED FOOD AND BEVERAGE CANS, LIDS AND CLOSURES AND COATINGS AND PROCESSES THEREFOR
Lawrence Nusser, Cleveland, Ohio, and Adrian J. Good, Warsaw, Ind., assignors to SCM Corporation, New York, N.Y., a corporation of New York
Continuation-in-part of application Ser. No. 858,819, Nov. 30, 1959. This application July 6, 1964, Ser. No. 381,613
Int. Cl. C09d 7/00; C08g 39/10; A23b 1/00
U.S. Cl. 260—30.4                                28 Claims This application is a continuation-in-part of application Ser. No. 562,366 filed Jan. 30, 1956, now abandoned, and of Ser. No. 858,819 filed Nov. 30, 1959, now abandoned.

This invention relates to coating compositions capable of forming protective coatings upon the surface of tin plated iron, black iron, aluminum and other metals from which diverse containers, lids and/or closures of all types may be fabricated. It relates also to metal containers and closures which have been coated with coating compositions in which the essential film-forming resinous components are blends of two types of interpolymers, one type being acidic and composed of interpolymers of vinyl chloride and di- and monoesters of $\alpha,\beta$-unsaturated dicarboxylic acids modified or not with certain acrylic and/or methacrylic esters, and the other type being neutral interpolymers which are modified or unmodified counterparts of said acidic interploymers and differ from their acidic counterparts in that the esters of the said dicarboxylic acids are all substantially neutral esters, i.e., diesters. All interpolymers in said blends preferably have relative viscosities between about 1.3 and 1.5

In brief, we have found that blends of acidic and neutral interpolymers of the modified or unmodified kinds described above are eminently useful as the film-forming components of sanitary coatings on food containers and closures in that they provide films having excellent resistance to acids, alkalies, moisture, steam, alcohol and other corrosive materials found in fruits, vegetables, fruit and vegetable juices, lard, shortening, glyceride oils, carbonated beverages, beer, meats, etc. Moreover, the applied and cured films are inert, odor- and taste-free, are capable of withstanding the mechanical forming operations employed in fabricating metal containers and closures, and are capable of withstanding the sterilizing or pastuerizing processes which are employed of necessity in the packaging of most foods and beverages in metal containers. Furthermore the film-forming materials which constitute the blended coatings have improved solubility over the vinyl chloride/vinyl acetate polymers which have been used extensively in the past as can coatings, and thereby permit the use of higher film-forming solids contents in hydrocarbon solution, i.e., in the solutions which constitute the coating compositions and in which liquid aromatic mononuclear hydrocarbon solvents predominate and are the essential solvating medium. Other advantages are pointed out hereinafter.

Accordingly, it is the primary object of this invention to provide coated metal containers and/or closures protected with an exposed inner surface composed of one or more cured films of the blends of acidic and neutral interpolymers of the types described above, said exposed film being in direct contact with the substrate or being a top coat over a primer applied to said substrate and in either case being exposed for direct contact with the foods packaged in said containers.

Another object is to provide coating compositions adapted for use in providing said exposed surface films, and to provide processes for applying said coatings to containers, lids, caps, hoods and other closures.

Another object is to provide coatings employing said acidic interpolymer(s) alone but preferably in blends with said neutral interpolymer(s), said coatings being particularly formulated for use in coating containers and/or closures for edible goods.

The invention will be understood from the following description taken in conjunction with the attached drawings in which:

FIGS. 2 and 3 represent a lid adapted to be crimped to the upper open end of the can of FIG. 1.

FIGS. 6 and 7 represent a lid adapted for use as a closure for a home-canning jar.

It is conventional in the coated container industry for the container manufacturer to assume all liability for the failure of coatings applied to the containers which he has fabricated. This potential liability mounts rapidly as soon as the coated containers are filled with foods and beverages, and the liability at that stage is many times greater than the mere cost of the coated containers. Since the coating film of each container stands between the manufacturer and his potential liability for failure of the container or for deterioration of the food it contains, it is apparent that the quality and durability of the protective film is desirably as high as economically feasible. What is economically feasible in connection with protective container coatings depends on various items of cost, e.g., the cost of the resinous material(s) which form the film, cost of the solvents which are needed to permit the resinous material to be applied (all of which solvents are lost to the manufacturer when the applied film is cured) and the labor and equipment charged involved in applying and curing the coating composition. Our coatings employ resinous film-forming components which are of moderate cost and which by reason of their improved solubility, entail the use of lower quantities of solvent per pound of applied and cured protective film. Moreover, the cost of solvents can be lowered in comparison with the ketone-soluble coatings of the past since our film-forming materials can be dissolved in mixtures which contain substantial proportions of low-cost aliphatic hydrocarbon solvents with major amounts of low-cost aromatic hydrocarbon solvents. Thus, our coatings possess economic attributes favoring their use. Moreover, the applied and baked films possess the desired protective and durability properties which are peculiar to the sanitary container-coating industry.

Containers for certain foods and beverages require greater protection by the organic coating(s) thereof than do containers for certain other foods and beverages. The latter containers could conceivably be protected adequately with a single applied organic film and efforts have continued throughout many years in the past to find a vinyl coating which, in a single coat, would provide the needed protection. While some coating materials have come close to meeting the requirements, none to our knowledge has heretofore been wholly satisfactory. Our present coatings, however, have been found to be satisfactory when applied in a single coat to aluminum, tinned iron or to clean black iron, etc.

Containers for the varieties of foods and beverages needing the utmost in protection are usually protected with two applied films, one of which may be of a different chemical nature than the other. Even in such two-coat containers, however, there is ever present the possibility that film voids may occur or that the under or priming coat may accidentally be scratched before the top coat is applied. Where such is the case, the top coat in such unprotected areas must then afford almost all if not all the protection which the two coats elsewhere provide. We have found that our coatings are eminently suited for the top coat since their outstanding resistance and adhesion qualities afford adequate protection even in such unprotected areas.

Following is a partial summary of the many meritorious performance qualities which our coatings afford:

Adhesion

Baked films of the blends applied to bare aluminum or to bare or primed tin plate, black iron or conventional chemically-treated metal surfaces have adequate adhesion to remain unimpaired when coated sheets or formed components of cans are sheared, punched, stamped, crimped or otherwise manipulated in the course of conventional fabrication and sealing practices.

Heat resistance

Baked films of the blends have moderately good resistance to deterioration when exposed to the heat of soldering operations, and generally good resistance to the heat of sterlizing or pasteurizing processes.

Taste and odor

The baked films of the blends have been found to be taste-free and odor-free when tested in accordance with conventional practices.

Resistance to alcohol

The baked films of the blends have been found to have adequate resistance to alcohol, such that one-coat cans can be used in packaging beer.

Resistance to moisture, acids and alkalies

Exposed films of the baked blends have been found by conventional packing and storage tests to meet established requirements when in contact with most of the typical foods conventionally used for testing.

Application characteristics

Our liquid coatings have been found satisfactory for application by the customary practices and machines currently employed in the fabrication of coated metal containers and closures.

Film-forming characteristics

Our applied liquid coatings can be converted rapidly by baking at temperatures which conventional ovens will accommodate; e.g., 5–10 minutes at 250°–350° F.

Solvent release

The converting and odor/flavor characteristics mentioned above indicate that the baked films exhibit good solvent-release characteristics.

Solids contents

The film-forming solids in our coating compositions can be as high as 35% without needing excessive amounts of ketone and other strong solvents, and can be higher when such strong solvents are used exclusively. Film-forming solids contents of at least about 18% (wt.) are usually employed.

Solvents

Our blends of film-forming materials can be dissolved at useful solids contents by using low-cost liquid aromatic hydrocarbon solvents such as benzene, toluene, xylene, etc. alone or in admixture with each other and at levels of 75–90% or more when used in admixture with aliphatic hydrocarbons, alkanols, esters, ketones, glycol ethers of lower alkanols, lower aliphatic esters of the latter, and other organic solvents, to give solutions having viscosities appropriate for the usual application methods.

Thermal stabilizers

We have found that certain non-film-forming, monomeric, 1,2-epoxy compounds are effective stabilizers for use in our blends in the can coating fields, and have found that their use contributes in part to the good resistance of our baked films to pasteurization and sterilization treatments. Epoxidized triglyceride oils can also be used effectively for stabilization, plasticization and other benefits. The epoxidized esters should have a 1,2-epoxy equivalency in excess of 1.0.

From the foregoing summary it will be apparent that our blended coatings have particular utility in the coated container and closure industry.

The film-forming materials

As indicated briefly above, our coatings employ a viscosity-restricted class of acidic interpolymers and/or blends of such interpolymers with companion neutral interpolymers as the principal film-forming material(s). The acidic interpolymers are of two types (B and D) secured from the monomers and proportions shown below:

TYPE B—ACIDIC

| Components | Weight percent | |
|---|---|---|
| | Max. | Preferred |
| Vinyl chloride | 55–75 | 67–73 |
| Diester(s) of $\alpha,\beta$-unsaturated dicarboxylic acid(s) selected from the group consisting of maleic acid, chloromaleic acid and fumaric acid each alcohol radical of said diester(s) being a hydrocarbon radical of 1–10 carbons (e.g. alkyl, aryl, cycloalkyl, alkaryl) substantially free of ethylenic unsaturation (i.e. diesters of 6–24 carbons) | 14–35 | 19–28 |
| Monoester(s) of $\alpha,\beta$-unsaturated dicarboxylic acid (s) of the same group as above, each alcohol radical of said monoesters being a hydrocarbon group of 1–10 carbons substantially free of ethylenic unsaturation (i.e. monoesters of 5–14 carbons) | 2–10 | 5–10 |
| Optional chemical relative-viscosity modifier (based on 100 parts of monomer) | 1–6.5 | 1.7–6.0 |

This type of acidic interpolymer and the method for preparing it through the use of 1.5–6.5% of trichloroethylene as chemical modifier is disclosed in U.S. Reissue Patent No. 24,206, the disclosure of which is here incorporated by reference.

TYPE D—ACIDIC

| Component | Weight percent | |
|---|---|---|
| | Max. | Preferred |
| Vinyl chloride | 55–80 | 67–75 |
| Diester(s) of the same specifications given for Type B interpolymers | 3–18 | 6–15 |
| Monoester(s) of the same specifications given for Type B interpolymers | 1–10 | 2–8 |
| Alkyl ester(s) of acrylic and/or methacrylic acids, each alkyl group thereof containing 6–12 carbons | 1–20 | 7–17 |
| Optional chemical relative-viscosity modifier (based on 100 parts of monomer) | 1–6.5 | 1.6–5 |

It will be seen that the Type D acidic interpolymer is a modification of the Type B interpolymer in which a part of the diester(s) of the latter is replaced and/or augmented with neutral alkyl ester(s) of acrylic and/or methacrylic acids.

The Type D interpolymers can be made in the same manners as are described in Reissue Patent No. 24,206 for the preparation of the Type B interpolymers by using 1.5–6.5% of trichloroethylene as the chemical modifier.

Either of the Type B or Type D interpolymers can be prepared from a single diester or mixtures of two or more diesters in combination with a single monoester or mixture of two or more monoesters. Likewise mixtures of such prepared interpolymers can be blended together to provide the acidic film-forming material. It will be noted that both types of interpolymers contain a small amount of monoester in their chemical make-up, and hence possess the designated acidic characteristics due to free carboxyl groups. These acidic characteristics are instrumental in providing good adhesion between the cured film and the underlying substrate and in providing other benefits. When the adhesion of the principal interpolymer is greater than is needed and for this or other reasons can be diluted, we prefer to dilute it by blending it with either or both of the companion neutral interpolymers identified below. Such neutral interpolymers useful for blending purposes can be prepared by omitting the monoester as an ingredient of the above formulations while using the other ingredients in the adjusted proportions which are shown below:

TYPE A.—NEUTRAL COUNTERPART OF TYPE B

| Component | Weight percent range | |
|---|---|---|
| | Max. | Preferred |
| Vinyl chloride | 55–75 | 67–73 |
| Diester(s) only | 25–45 | 27–33 |
| Optional chemical modifier (based on 100 of monomers) | 1.0–6.5 | 1.7–6.0 |

TYPE C—NEUTRAL COUNTERPART OF TYPE D

| Component | Weight percent range | |
|---|---|---|
| | Max. | Preferred |
| Vinyl chloride | 55–80 | 67–75 |
| Diester(s) only | 3–23 | 6–20 |
| Alkyl ester(s) of acrylic and/or methacrylic acids | 1–22 | 6–20 |
| Optional chemical modifier (based on 100 of monomers) | 1.0–6.5 | 1.6–5 |

It should be noted that either or both or the neutral interpolymers can be blended with either or both of the acidic interpolymers to secure desired qualities in an intended baked film.

In both the acidic and neutral interpolymers, we prefer to have the unsaturated dicarboxylic acid of the esters represented by a mixture of maleic and fumaric acids, with at least 50% by weight being fumaric acid. We also prefer to have the alcohol radicals of the diesters and of the acidic monoesters represented by the butyl radical, and we especially prefer the n-butyl radical. A commercial material offered as di-n-butyl maleate but actually containing approximately equal proportions of di-n-butyl maleate and di-n-butyl fumarate is especially useful in preparing our preferred acidic and neutral interpolymers. Mono-n-butyl monohydrogen maleate is especially preferred for use in preparing the acidic interpolymers.

The interpolymers of this invention can be prepared by mixing together the several monomeric starting materials and subjecting them to any of the usual free-radical polymerization systems and conditions, for instance in solution in solvents, and in emulsion in aqueous media, using free-radical generating catalysts and conditions. In practical production, however, it will usually be preferred to polymerize these materials in suspension in aqueous media by the known suspension polymerization technique. In general this technique involves suspending the monomers in an aqueous medium containing non-miscelle-forming suspending agents. Suspending agents suitable for this purpose are hydrophilic high polymeric materials such as gelatin, polyvinyl alcohol, polyacrylic acid, polymaleic acid, methyl cellulose, and the like. The aqueous medium constitutes about at least half of the entire polymerization mass. The reaction is promoted by the presence of free-radical generating agents soluble in the monomer phase of the suspension, such as benzoyl peroxide, perbenzoic acid, p-chlorobenzyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order to 30°–100° C. The monomers in the suspended droplets become polymerized, yielding a suspension of granular resin in the aqueous medium. From this aqueous suspension the resin is isolated by filtration.

While trichloroethylene is preferably employed in the preparation of our acidic and neutral polymers as the relative viscosity modifier, equivalent results can be secured by either (a) omitting all chemical modifier(s) entirely and concomitantly polymerizing the mixture of starting materials at temperatures between 70° and 85° C., preferably 74°–77° C., all as described in U.S. Patent 2,849,424, here incorporated by reference, (b) by replacing the trichloroethylene with 1–6.5% by wt. of halogenated unsaturated hydrocarbons of the class consisting of cis- and trans- 1,2-dichloroethylene, cis- and trans-1,2-dibromo-ethylene, 1,1-dichloro -2- bromoethylene, allyl chloride, methallyl chloride, allyl bromide, allyl iodide, methallyl bromide, methallyl iodide, 2,3-dibromo-1-propene, 3,3-dichloro-1-propene, 2,3-dibromo-1-propene, 1-chloro-2-butene, 1-chloro-2-decene and 1-chloro-2-octadecene, all as disclosed in U.S. Patent 2,849,422, here incorporated by reference, or (c) by replacing the trichloroethylene with 1–6.5 by weight of halogenated hydrocarbons containing up to 16 carbon atoms and containing up to 5 halogen atoms selected from the group consisting of fluorine, bromine and iodine. These exemplified by the halogenated methanes, such as carbon tetrachloride, carbon tetrabromide, bromochlorodifluoromethane, bromoform, methyl chloride, methyl bromide, methyl iodide, chlorfrom, iodoform, methylene dichloride, methylene dibromide and and the like, halogenated ethanes such as ethyl chloride, 1,1,2-trichloroethane, 1,1,2,2-tetrachloroethane, ethylene chloride, ethylene bromide, ethyl bromide, ethyl iodide, 1,1,2-trichloro-2-fluoroethane, 1,1,2-tribromoethane, 1,1-dichloro-2-bromoethane, pentachloroethane and the like, and halogenated propanes and butanes, such as n-propyl chloride, n-propyl iodide, isopropyl chloride, isopropyl bromide, n-butyl chloride 1,4-dichlorobutane, t-butyl chloride, and the like. Suitable higher halogenated hydrocarbons include for instance amyl chloride, dodecyl bromide, dodecyl iodide, the dichloropentanes, hexadecyl chloride and the like. The use of such halogenated hydrocarbons in place of trichloroethylene is disclosed in U.S. Patent 2,849,423, here incorporated by reference.

The exact function of the trichloroethylene or the various compounds or mixtures thereof which can be used as relative-viscosity modifiers to replace it in the polymerization process is not fully understood; possibly they act as chain terminators or transfer agents, or perhaps they affect the growing polymer chains in some manner not yet elucidated. At any rate polymers produced in the absence of such materials and outside of the temperature range of 70–85° C. do not possess the desirable properties which render our baked films appropriate as can lining. When the starting materials are either polymerized in the presence of such modifiers, or in the absence of such modifiers but within the temperature range of 70–85° C., the finished products are found to have relative viscosities (in 1% cyclohexanone solution) ranging between 1.27–1.30 and 1.70 for the neutral copolymers and between about 1.2 and 1.6 for the acidic copolymers.

If desired or necessary to remove the modifiers at the completion of the polymerization, this can be done by means of vacuum drying, solvent extraction or the like.

In our blended coating, the acidic interpolymer(s) should preferably constitute 2–30% by weight on the solids of the blended acidic and neutral interpolymers and may constitute as much as 50, 75 or 90%. However, the acidic interpolymer(s) can constitute all of the film-forming solids of coatings intended for particular service conditions, as exemplified hereinafter.

Solvents

The acidic interpolymers and/or blends of acidic and neutral interpolymers of this invention can be made into coating compositions by using any solvents or solvent mixtures which yield a homogeneous single-phase solution. However, they are soluble in low cost aromatic hydrocarbon solvents such as benzene, toluene, xylene, etc. in substantial proportions (e.g., copolymer contents at 20–35% of the total weight of the solution) and hence it is economically desirable to use such solvents in amounts of at least about 70–75% of the total. Aliphatic hydrocarbon solvents can be used along with such low cost solvents in amounts up to about 25–30%, preferably with additional small amounts of alkanols of up to 8 carbons, ketones, esters, alkylene- and/or polyalkylene-glycol monoalkyl ether alcohols having up to 8 carbons in each alcohol radical, lower saturated aliphatic monocarboxylic acid esters of such ether alcohols, and other strong solvents (e.g. nitro-hydrocarbons such as nitro-propane) as the balance. Such mixtures of solvents give solutions (at 20–35% interpolymer solids) having useful viscosities. For container coating work, viscosities between about 13 and 75 seconds (No. 4 Ford cup) are desirable. Typical solvents comprise acetone, methyl ethyl ketone, methyl isobutyl ketone, cyclohexanone, ethyl butyl ketone, isophorone, diacetone alcohol, ethyl acetate, n-butyl acetate, isobutyl acetate, butyl propionate, tetrahydrofuran, dioxane, propylene carbonate, 2-ethoxyethanol, 2-ethoxyethyl acetate, 2-nitropropane, nitrobenzene, dimethyl formamide and acetonitrile. Such and other solvents of the named classes are easily released from the wet applied film during baking when they are present in amounts giving viscosities within the above range. The neutral copolymers are characterized by complete solubility in toluene at 25% solids, and the acidic copolymers are characterized by complete solubility in a 90/10 mixture toluene and methyl ethyl ketone at 25% solids.

Thermal stabilizers

The acidic interpolymer(s) and blends thereof with neutral interpolymer(s) have good thermal stability (resistance to thermal breakdown) and hence can be baked at higher temperatures than vinyl chloride-vinyl acetate copolymers. Nevertheless, we have found it beneficial to include small amounts of non-film-forming 1,2-epoxy compounds as thermal stabilizers. Usually, amounts below 1% by weight on the film-forming solids are sufficient, preferably between 0.02% and 0.5%. Propylene oxide is our preferred stabilizer but other non-film-forming epoxides such as phenoxypropylene oxide, epichlorhydrin, ethylene oxide, diallyl ether monoxide and/or phenyl glycidyl ether can be used as well. When the compositions are processed and stored in glass or equivalent inert containers, the 1,2-epoxy compound(s) can be omitted. Example 3 illustrates the use of epoxidized triglyceride oil(s) as both stabilizer and plasticizer. Amounts between about 2 and 15% by weight, based on the total copolymers, are satisfactory, and amounts between about 3–10% are preferred.

Application and baking of coatings

The coating compositions of the invention can be applied to surfaces of formed containers and closures or to sheet stock from which containers and/or closures are to be fabricated by any of the usual means, such application being for example by roller coating, spraying, knifing, etc. The compositions can be adapted particularly for roller coating since the solvency characteristics of the film-forming materials permit the use of solvents which have little or no harmful effects on the resilient material of the rollers such as ketones and other strong solvents of prior can coatings have. Our coatings are also advantageous in respect to any of the conventional application methods since their higher resinous solids contents permit thicker baked films to be secured per layer of applied wet film. This permits an increased rate of production per applied unit of baked film thickness, and this latter benefit is accompanied with lower lost-solvent charges. This reduction in solvent charges can be of the order of 65% based on present costs of solvents in ketone-soluble vinyl chloride/vinyl acetate sanitary coatings, thereby saving as much as 17 cents per pound of applied resin.

The film-forming materials of our coatings can be baked at somewhat lower temperatures than used for prior container coatings or can be air- or forced-dried, thereby permitting them to be used as a coating on paper inserts of the types frequently used in caps or lids of food and beverage containers. However, in the container industry, it is important to have short baking schedules. Since time and baking temperature are inversely related, short baking schedules involve higher temperatures. We have found that conversion can be effected in 5–10 minutes at 250–350° F., depending on the particular formulation. If longer time can be permitted, then lower temperatures can be used. Conversely, if shorter time is needed, higher temperatures up to about 450° F. can be employed. Our stabilized coatings are not harmed by the latter or somewhat higher temperatures in short baking schedules.

It will be understood that coatings can be originally formulated to give solutions which are adapted for shipping and storage, with the intention that additional solvents will or may be added just prior to application. Our coatings permit this practice to be followed.

Coating formulation

While most aspects of clear coating formulation have been discussed hereinabove, it will be apparent that our coatings can be formulated for particular effects by including small amounts of plasticizers, other film formers, waxes, etc. While most container linings are clear, some are tinted by including dyes, and some are pigmented, as by including small amounts of acid-resistant white or colored pigment, or aluminum flake pigment. Our coatings can be so tinted and/or pigmented. Some fillers can also be included, such as flake mica, talc, etc., but ordinarily fillers are avoided in the interest of securing dense pore-free protective films having the utmost in sanitary protective qualities. Any of the usual pigments can be used. Basic pigments can be employed, where desired.

The following examples illustrate the principles of our invention and include the best modes presently known to us for practicing those principles.

EXAMPLE 1

Coating compositions particularly adapted for general purpose container coating work were prepared from the following materials in percentage by weight:

1-A

| | Percent |
|---|---|
| Neutral interpolymer [1] (Type A) | 33.25 |
| Acidic interpolymer [2] (Type B) | 1.75 |
| Toluol | 63.95 |
| Isopropyl alcohol | 1.00 |
| Propylene oxide | .05 |
| Total | 100.00 |

| 1-B | Percent |
|---|---|
| Neutral interpolymer [1] (Type A) | 24.50 |
| Acidic interpolymer [2] (Type B) | 10.50 |
| Toluol | 63.95 |
| Ethylene glycol monoethyl ether | 1.00 |
| Propylene oxide | .05 |
| Total | 100.00 |

[1] Prepared in accordance with Example 1 of Reissue Patent 24,206 except that the half ester (mono-n-butyl monohydrogen maleate) was omitted.
[2] Prepared in accordance with Example 1 of Reissue Patent 24,206.

The resins, in powder form, were sifted into the warmed solvents with agitation, and agitation was continued until complete solution had been secured. The solution was then strained, after which the propylene oxide was added and blended in by agitation until uniformly dispersed through the solution.

For spray application in coating can bodies the solution was reduced 3:1 with toluene. The coated can bodies were then passed into an oven where they were baked for 6 minutes at 300° F.

The following data indicate the effect of dilution on the viscosity of original 35% NVM (non-volatile matter) solutions of the 5% and 30% acidic/neutral mixtures of the interpolymers of Example 1 dissolved in toluol plus an added 1% of ethylene glycol monoethyl ether:

5% acid—95% neutral
(Ex. 1-A)             Viscosity
    35% NVM            2180 cp.[1]
    25% NVM            7080 (No. 4 Ford cup).
    18.4% NVM          1880 (No. 4 Ford cup).
30% acidic—70% neutral
(Ex. 1-B)             Viscosity
    35% NVM            980 cp.[1]
    26.9% NVM          7080 (No. 4 Ford cup).
    19.4% NVM          1880 (No. 4 Ford cup).

[1] By Brookfield Viscometer at 20 r.p.m. on No. 3 Spindle.

For testing thermal resistance, example formulations 1-A and 1-B were applied to test panels of black iron and tin plate, and the panels were heated 20 minutes at 350° F. Two commercial sanitary coatings (maleic modified vinyl chloride/ vinyl acetate and vinyl chloride/ vinylidene chloride of U.S. Patents 2,299,433 and 2,675,334 respectively) were tested on the same metals at the same time. Also tested were separate films of the neutral interpolymer and of the acidic interpolymer of the 1-A and 1-B formations, carried on like metal panels. The neutral interpolymer as well as formulations 1-A and 1-B remained substantially unaffected by the heat test while the acidic interpolymer film was somewhat darkened, whereas the films of the commercial sanitary vinyl coatings turned to dark brown or black. The tests showed that formulations 1-A and 1-B were especially resistant to decomposition by heat, which was completely unexpected in view of the decomposition of the acidic interpolymer by itself. It is evident that decomposition of the acidic interpolymer in amounts of 5% (formulation 1-A) and 30% (formulation 1-B) was prevented by the presence of the neutral interpolymer of both formulations.

The same coatings were applied to other metal panels, baked 6 minutes at 300° F. and then were tested for resistance to pasteurization processing by immersion for 30 minutes in water at 150° F. The various films were tested on black iron, on chemically cleaned (phosphated) iron, on tin plate, on tin plate primed with a conventional oleoresinous phenol/aldehyde varnish [1] primer and on tin plate primed with a conventional epoxy (bisphenol/epichlorhydrin condensation product) primer. The films were examined after pasteurization for adhesion by conventional "Scotch" tape test, and were examined visually for evidence of whitish areas commonly called "blush." It was found that from the standpoint of both blush resistance and retained adhesion, films of formulations 1-B were the best of the lot while films of formulations 1-A and 1-B were superior to the sanitary vinyl coatings employed in the test.

It will be noted that the resin solutions of the above example were made by sifting a mixture of the resins into the solvents. This procedure has been found to give lower viscosities than where either resin is dissolved in the solvents before adding and dissolving the other.

EXAMPLE 2

A coating composition particularly adapted for coating the soldered [2] seam on beer can bodies was prepared from the following materials in percent by weight:

| | Percent |
|---|---|
| Acidic interpolymer of Ex. 1 | 12.5 |
| Amsco F [1] | 71.70 |
| Isophorone | 15.75 |
| Propylene oxide | .05 |

[1] A hydrogenated aromatic petroleum hydrocarbon solvent produced by American Mineral Spirits Co. and having a Kauri Butanol (KB) Value of about 78.

The composition was prepared in the manner described in Example 1. The finished composition has a viscosity of 13″–17″ at 80° F. on the No. 4 Ford Cup and was sprayed full body on the hot seams. Conversion was effected by the heat of the seamed can bodies. It will be understood that the can bodies would subsequently be lined internally by spraying with a blended coating such as that of Example 1-A, after which they would be baked. That baking would assist in effecting a full conversion of the seam stripe as well as causing conversion of the lining. The acidic interpolymer is particularly adapted for use by itself in the seam coating since especially good adhesion to the soldered seam and adjacent portions of the can body is necessary to insure durability of the lining in the seam area. When the closure of a can is crimped onto the body, the seam area is subjected to greater stresses than the other portions, and the seam coating as well as its overlying lining is more apt to be damaged. The excellent adhesion of the seam coating insures complete integrity of the lining after the closure has been secured to the body.

EXAMPLE 3

A sanitary coating composition particularly adapted for use as a primer on steel storage tanks was prepared from the following materials:

| | | |
|---|---|---|
| Acidic interpolymer of Ex. 1 | lbs | 3.0 |
| Persian gulf red iron oxide | lbs | 1.0 |
| Magnesium silicate | lbs | 0.5 |
| Micronized mica | lbs | 1.0 |
| Silica (Santocel No. 54) | lbs | 0.125 |
| Epoxidized glyceride oil (soybean, 6% oxirane oxygen) | pints | 0.25 |
| Xylol | do | 3.0 |
| Methyl isobutyl ketone | do | 4.0 |
| Cyclohexanone | do | 0.75 |

The interpolymer was dissolved in the solvents and then the pigments and other materials were added. The resulting mass was milled and finally strained. The finished coating had a nonvolatile content of 46.3%, an interpolymer solids content of 25%, a total binder content of 28.6% and a viscosity of 71 KU at 77° F. For

[1] An oil-soluble, non-heat hardening phenol/aldehyde resin heat-bodied with from 6–18 gallons of drying oil per 100 pounds of said phenol/aldehyde resin.

[2] Any "soft-solders" of the ASTM Standard Specifications for Solder Metal (B–32–21; ASTM Standards 1933 Pt. I, Metals P. 817) can be used for soldering the cans.

spray application it was reduced 4:1 with a reducer composed as follows:

| | Pints |
|---|---|
| Toluol | 3¾ |
| Methyl isobutyl ketone | 4¼ |

The epoxidized glyceride oil is included to increase the flexibility of the film. The coating air-dries.

EXAMPLE 4

The acidic interpolymer of Example 1 was dissolved in toluol to give a solids content of 35%. The neutral interpolymer of Example 1 was dissolved to give a similar solution. At 80° F. the acidic interpolymer solution had a viscosity of 305" (No. 4 Ford cup) while the solution of neutral interpolymer was too heavy at this temperature to permit a viscosity determination by the Ford cup method. The addition of 1% of isopropyl alcohol to the acidic solution reduced the viscosity to 169" and also rendered the solution clear while in the absence of the alcohol it was cloudy. A 30% solids solution of the acidic interpolymer with 1% added isopropyl alcohol had a viscosity of 63" (No. 4 Ford cup). A 25% solids solution of the neutral interpolymer in toluol had a viscosity of 130" while a 20% solution had a viscosity of 35". All of these latter solutions were clear. Similar extensive reductions in viscosity were secured when methyl, ethyl,, butyl, cyclohexyl and octyl alcohol were added in small amounts or when glycol monoethers such as ethylene glycol monobutyl ether, diethylene-glycol monoethyl ether, dipropylene glycol monobutyl ether, or diethylene glycol monooctyl ether were used. Corresponding reductions in viscosity are secured with acidic/neutral blends. To 100 ml. of clear solution of 30% acidic interpolymer in toluol plus 7% isopropyl alcohol, and to a clear 20% solution of the neutral interpolymer in toluol plus 1 isopropyl alcohol, was added VM&P naphtha until the solutions turned cloudy. The acidic solution accepted 40 ml. of added VM&P naphtha, while the neutral solution accepted 25 ml. It is thus evident that the interpolymers have excellent solubility in hydrocarbon solvents when a small percentage of the solvent component is a lower aliphatic alcohol. Monohydric alcohols of up to 8 carbons function similarly. Also glycol/alkanol monoethers (e.g., glycol monoethers such as ethylene glycol monoethyl ether) having up to 8 carbons in each alcohol radical have a similar potent solubilizing effect on hydrocarbon solutions of the interpolymers. Important savings in solvent costs can be secured by using the discovery in connection with our blended coatings. Whereas a conventional vinyl chloride/vinyl acetate sanitary coating resin would involve solvent costs of around 27 cents per pound of resin, the 30% acidic/70% neutral blend of the interpolymers involves solvent costs of about 9.3 cents per pound of resin. Amounts of glycol monoethers and/or of alkanols needed for this solubilizing function seldom need exceed about 10% of the total solvents in the resin solutions, and as indicated above, even 1% is very effective.

EXAMPLE 5

The neutral interpolymer of Example 1 was replaced in formulations 1–A and 1–B with one prepared from vinyl chloride 78%, cyclohexyl maleate neutral esters 24% and trichloroethylene 4%. No significant differences could be detected when tests duplicating those of Example 1 were carried out.

EXAMPLE 6

Three Type B resins were formulated as follows:

| Materials used | Proportions (weight percent) | | |
|---|---|---|---|
| | 6A | 6B | 6C |
| Vinyl chloride | 55 | 75 | 6 |
| Di-n-butyl maleate/fumarate | 35 | 15 | 30 |
| Mono-n-butyl monohydrogen maleate | 10 | 10 | 5 |
| Trichloroethylene (on 100 parts of monomer) | 3 | 3 | 5 |

The resulting resins were combined singly with the neutral resin of Example 1 to form three coating solutions corresponding to the test formulations shown below for testing against the indicated "Control Coating":

| | Test coatings | Control coatings |
|---|---|---|
| Type B Resin of Example 1 | None lb. | 10.8 lbs. |
| Type B Resin 6A, 6B, 6C | 10.8 lbs. | None lbs. |
| Type A (neutral) resin of Ex. 1 | 144.2 lbs. | 144.2 lbs. |
| Methyl isobutyl ketone | 24.8 lbs. | 24.8 lbs. |
| Acetone, c.p. | 18.6 lbs. | 18.6 lbs. |
| Toluol | 576.6 lbs. | 576.6 lbs. |
| Propylene oxide | 0.5 lbs. | 0.5 lbs. |

The resulting four coating compositions were applied to iron can stock, baked 11 minutes at 305° F. and then tested for interior can-coating qualities; e.g. blush resistance, adhesion and fracture. No significant differences could be detected as a result of the tests.

EXAMPLE 7

Three Type B resin were prepared in the manner described in Example 1 of Reissue Patent 24,206 using the same starting materials in the following proportions:

EXAMPLE 7

| | Weight percent | | |
|---|---|---|---|
| | 7A | 7B | 7C |
| Vinyl chloride | 70 | 70 | 70 |
| Di-n-butyl maleate/fumarate | 27.92 | 26.88 | 25.84 |
| Mono-n-butyl mono-hydrogen maleate | 2.08 | 3.12 | 4.16 |
| Trichloroethylene | 2.92 | 2.92 | 2.92 |
| Intended carboxyl value | 2 | 3 | 4 |

The resulting interpolymers were used in the following tests.

TEST I

Resin 7–C was used in the following formulation to prepare a coating solution:

Coating solution 7–C

| | Lbs. |
|---|---|
| Acidic Resin 7–C | 3 |
| Neutral Resin of Example 1 | 22 |
| Toluol | 59.95 |
| Methyl ethyl ketone | 15.00 |
| Propylene Oxide | .05 |

The solution was then used to provide a top coat on tinned iron panels which had already been primed with an epoxy/urea formaldehyde resin formulated as follows:

Epoxy/urea formaldehyde resin

| | | |
|---|---|---|
| Araldite Resin [1] | lbs | 10 |
| Butylated urea/formaldehyde resin solution, 50% solids in 22 parts butanol and 28 parts xylol | gal | 1⅕₆ |
| Ethyleneglyol monoethyl ether acetate | gal | 1⅞₆ |
| Diacetone alcohol | gal | 1⅞₆ |

[1] An epichlorhydrin/bisphenol epoxy resin having an epoxy equivalent of 1600–1900 and an hydroxyl equivalent of 190; melting point 117–133° C.

The resins are dissolved in the solvents, then applied to the panels at 12 mg./4 square inches and baked 10 minutes at 410° F. to give the primed panels of the test. The wet top-coated panels were baked for 6 minutes at 300° F., allowed to stand overnight, pasteurized 30 minutes at 150° F. and finally were examined for "blush," adhesion (Scotch-tape test) and fracture (2-hour copper sulfate test).

For comparison, similar panels were also prepared in the same manner except that the top coat was provided by a solution using the acidic and neutral resins of Example 1 above blended together in solvents according to the following formulation:

Coating solution 7-D

| | Lbs. |
|---|---|
| Acidic resin of Example 1 | 3 |
| Neutral Resin of Example 1 | 22 |
| Toluol | 59.95 |
| Methyl ethyl ketone | 15.00 |
| Propylene Oxide | .05 |

The following table gives the results of the tests.

| | Blush | Adhesion | Fracture |
|---|---|---|---|
| Coating solution 7-C | 0-0-0 | 0-0-0 | 2-3-3 |
| Coating solution 7-D | 0-0-0 | 0-0-0 | 1-2-2 |

(0=perfect; 10=complete failure)

From these tests it was concluded that both top coats on the test panels were fully satisfactory in "blush" and adhesion, and that both were passable in fracture with Resin 7-C giving a baked film somewhat inferior in fracture to the film secured from resin solution 7-D.

TEST 2

Resins 7-A, 7-B and 7-C and the neutral resin of Example 1 were converted to coating solutions by dissolving in solvents according to the following formulations:

COATING SOLUTION

| | 7-A | 7-B | 7-C |
|---|---|---|---|
| Resin 7-A | 12.00 lbs.[1] | None | None. |
| Resin 7-B | None | 8.00 lbs.[2] | Do. |
| Resin 7-C | do | None | 6.00 lbs.[3] |
| Neutral Resin of Ex. 1 | 13.00 lbs.[4] | 17.00 lbs.[5] | 19.00 lbs.[6] |
| Toluol | 59.95 lbs. | 59.95 lbs. | 59.95 lbs. |
| Methyl ethyl ketone | 15.00 lbs. | 15.00 lbs. | 15.00 lbs. |
| Propylene | .05 lbs. | .05 lb. | .05 lb. |

[1] 48% of resin solids, by weight.
[2] 32% of resin solids, by weight.
[3] 24% of resin solids, by weight.
[4] 52% of resin solids, by weight.
[5] 68% of resin solids, by weight.
[6] 76% of resin solids, by weight.

Groups of primed panels like those of Test 1 were then topcoated with each of the coating solutions 7-A, 7-B, 7-C and 7-D to give film weights of 18-22 mg. per 4 square inches after which all of wet panels were baked, pasteurized, stored and tested as in Test 1. The following table summarizes the results of the tests.

| | Blush | Adhesion | Fracture |
|---|---|---|---|
| Topcoat derived from coating solution: | | | |
| 7-A | 0-0-0 | 0-0-0 | 2-2-0 |
| 7-B | 1-1-1 | 0-0-0 | 1-2-2 |
| 7-C | 0-0-0 | 0-0-0 | 2-2-2 |
| 7-D | 0-0-0 | 0-0-0 | 1-2-2 |

It was judged from these results that coating solution 7-B would be unacceptable for certain container work because of its weakness in blush resistance, and that all three of the other coatings would be acceptable for such work, even as to fracture resistance.

It will be understood that Test 2 was designed to give equal acidity (2×48%=3×32%=4×24%=8×12%) in all of the coating solutions and in the baked films derived therefrom. It will also be apparent that controlled acidity does not assure the production of baked films universally meeting can-makers requirements.

EXAMPLE 8

Beer can body coating for spraying application

Acidic resin of Type D–No. 1:
    Vinyl chloride __________________percent__ 70
    Di-n-butyl maleate/fumarate _________do____ 6.7
    Mono-n-butyl maleate _______________do____ 8.3
    2-ethyl hexyl acrylate ______________do____ 15
    Trichloroethylene (on 100 of monomers)
        do____ 1.7
    Relative viscosity ___________________ 1.35–1.40

Neutral resin of Type C–No. 1:
    Vinyl chloride __________________percent__ 75
    Di-n-butyl maleate/fumarate _________do____ 13
    2-ethyl hexyl acrylate ______________do____ 12
    Trichloroethylene (on 100 of monomers)
        do____ 1.7
    Relative viscosity ___________________ 1.32–1.38

The above resins are prepared in the manner described in Example 1, U.S. Reissue Patent No. 24,206.

A beer can body spray coating is prepared from the above resins according to the following formulation:

| | Lbs. |
|---|---|
| Acidic resin (8D–1) | 1.68 |
| Neutral resin (8C–1) | 19.32 |
| Toluol | 58.95 |
| Methyl ethyl ketone | 20.00 |
| Propylene oxide | .05 |

The resins are mixed and sifted into the solvents with agitation until dissolved. If the solution is still "seedy" it can be warmed to 150° F. and then filtered. The resulting solution has a solids content of 21%, weighs 7.7 lbs./gal., and has a viscosity of 30–40″ at 80° F. (No. 4 Ford cup).

The solution is sprayed on beer can bodies and then the coated bodies are baked 6 minutes at 300° F. Taste, resistance, forming and other tests establish the reliable performance of the baked coatings for this type of service.

EXAMPLE 9

This example illustrates the use of cross blends of the Type A, B, C and D resins in can coatings.

Three coating solutions were tested, their formulations being as follows:

| | Coating A | Coating B | Coating C |
|---|---|---|---|
| Acidic resin of Ex. 1 (Type B) | 10.8 lbs. | | 10.8 lbs. |
| Neutral resin of Ex. 1 (Type A) | 144.2 lbs. | 144.2 lbs. | |
| Acidic resin 8-B-1 (Type D) | | 10.8 lbs. | |
| Neutral resin 8-D-1 (Type C) | | | 144.2 lbs. |
| Methyl isobutyl ketone | 24.8 lbs. | 24.8 lbs. | 24.8 lbs. |
| Acetone, c.p. | 18.6 lbs. | 18.6 lbs. | 18.6 lbs. |
| Toluol | 576.6 lbs. | 576.6 lbs. | 576.6 lbs. |
| Propylene oxide | 0.5 lbs. | 0.5 lbs. | 0.5 lbs. |

Test panels were primed with the epoxy/urea formaldehyde primer of Example 7, baked, cooled and then coated with individual films of the above coatings at the rate of 20 mg./4 sq. in. and baked 6 minutes at 300° F. Three test panels in a group representing each of the coatings were then subjected simultaneously to pasteurization treatment at 170° F. for 15 minutes, cooled overnight and rated for blush, adhesion and fracture. The data is summarized below for each of the nine test panels. 0 represents "perfect," 3 represents "passing" and 10 represents "complete failure."

| Coating | Blush | Adhesion | Fracture |
|---|---|---|---|
| A (Control) | 0-0-0 | 0-0-0 | 1-2-2 |
| B | 1-1-1 | 0-0-0 | 1-2-2 |
| C | 3-3-3 | 0-0-0 | 2-2-3 |

EXAMPLE 10

Coatings compositions for can ends were compared to evaluate the performance quality secured when the acidic resin of Example 1 hereof (hence Example 1 of Reissue No. 24,206) was replaced with acidic resins prepared in accordance with the respective disclosures of U.S. Patents 2,849,422, 2,849,423 and 2,849,424.

The formulations employed in the tests coatings are as follows:

| | |
|---|---|
| Acidic resin _________________________pounds__ | 10.8 |
| Neutral resin of Ex. 1 hereof ____________do____ | 144.2 |
| Methyl isobutyl ketone _______________gallons__ | 24.8 |
| Acetone, c.p. __________________________do____ | 18.6 |
| Toluol _______________________________do____ | 576.6 |
| Propylene oxide _______________________lbs__ | 0.5 |

The coatings are prepared by dissolving the mixed resins in the mixed solvents at 120° F. and then filtering. The resulting coatings are applied to flat can stock by roll-coating, followed by baking 11 minutes at 305° F.

The acidic resins used in the test coating are shown below:

Test A—Acidic resin of Example 1, Re. 24,206
Test B—Acidic resin of U.S. 2,849,422—Run No. 4.
Test C—Acidic resin of U.S. 2,849,422—Run No. 2.
Test D—Acidic resin of U.S. 2,849,423—Run No. 1.
Test E—Acidic resin of U.S. 2,849,423—Run No. 5.
Test F—Acidic resin of U.S. 2,849,423—Run No. 7.
Test G—Acidic resin of U.S. 2.849,424—Example 1.

The enameled sheet stock was cut and formed into can ends, and then the ends were subjected to pasteurization treatment for 15 minutes at 170° F., cooled overnight and tested for blush, adhesion and fracture. Suffice it to say that the results of the tests revealed no variations in performance worthy of comment, all of the coatings being equally acceptable for interior service in cans holding edible products.

EXAMPLE 11

The following illustrate roll coat enamels for beer can ends, being used thereon as a single coat applied at the rate of 18–22 mg./4 sq. inches.

| | Topcoat A | Topcoat B |
|---|---|---|
| Acidic resin of Ex. 1 hereof, lbs_______________ | 5.1 | 4.9 |
| Neutral resin of Ex. 1 hereof, lbs_____________ | 202.6 | 192.7 |
| Xylol, gals_______________________________ | 75.1 | 75.4 |
| Isophorone, gals__________________________ | 3.1 | 3.1 |
| 2-nitropropane, gals_______________________ | 2.9 | None |
| Methyl isobutyl ketone_____________________ | None | 3.5 |
| Propylene oxide, lbs_______________________ | 0.5 | 0.5 |
| Viscosity, 77° F. (No. 4 Ford cup seconds)____ | 60–75 | 60–90 |
| Solids content (wt.) percent_________________ | 25 | 24 |
| Weight per gallon, lbs_____________________ | 8.00 | 7.91 |
| Bake at 355° F., min_______________________ | 10 | 10 |
| Reducer (if needed)_______________________ | (1) | (1) |

[1] Xylol.

The coatings are prepared by dissolving the mixed resins in the solvents with the aid of heat at 120° F., and then are filtered. The applied and baked coatings are shown by commercial can manufacturer's tests to meet all requirements for beer can service. As will be understood, the coatings are formulated above to permit them to be applied commercially to flat sheet iron by roll-coating equipment.

EXAMPLE 12

This example illustrates the effect of alcohols to decrease viscosity of can coatings prepared from the Type D (acidic) and Type C (neutral) resins. It will be understood that the advantage secured from reduced viscosity is that at a selected viscosity, higher-solids contents can be secured in the coatings in the presence of the alcoholic solvents. The following formulations are compared.

| | Coating A | Coating B | Coating C |
|---|---|---|---|
| Acidic resin D–1 of Ex. 8, lbs_____________ | 12.2 | 12.2 | 12.2 |
| Neutral resin C–1 of Ex. 8, lbs____________ | 141.0 | 141.0 | 141.0 |
| Toluol, gals_____________________________ | 67.8 | 63.3 | 58.9 |
| Methyl ethyl ketone, gals_________________ | 18.2 | 18.1 | 18.0 |
| 99% isobutyl alcohol, gals________________ | None | 4.6 | 9.2 |
| Propylene oxide, lbs_____________________ | 0.5 | 0.5 | 0.5 |
| Viscosity at 77° F. (No. 4 Ford Cup) sec___ | 31.5 | 20.0 | 34.5 |
| Solids content (wt.), percent_____________ | 20 | 20 | 20 |
| Weight per gallon, in pounds_____________ | 7.67 | 7.64 | 7.62 |

The coatings are prepared by dissolving the mixed resins in the mixed solvents at 130° F. and filtering. All of the coatings can be baked 11 minutes at 305° F. It will be noted that Coating B has a much lower viscosity than that of Coating A, due to the judicious use of isopropyl alcohol, and that this advantage can be lost by using too much alcohol, as shown by Coating C.

EXAMPLE 13

The following formulations of 5 acidic resins of Type D and 3 neutral resins of Type C illustrate formulation variations which yield blended coating compositions satisfactorily meeting can-coatings requirements for various types of such service.

| | Acidic resin formulations | | | | |
|---|---|---|---|---|---|
| Material | Resin A, percent | Resin B, percent | Resin C, percent | Resin D, percent | Resin E, percent |
| Vinyl chloride_____________________________ | 55.0 | 55.0 | 75.0 | 75.0 | 75.0 |
| Di-n-butyl maleate/fumarate_______________ | 20.0 | 17.5 | 11.5 | 5.0 | 18.0 |
| 2-ethyl hexyl acrylate______________________ | 20.0 | 17.5 | 11.5 | 18.0 | 5.0 |
| Monohydrogen n-butyl maleate____________ | 5.0 | 10.0 | 2.0 | 2.0 | 2.0 |
| Trichloroethylene (1% on monomers)_______ | 1.7 | 1.7 | 1.7 | 1.7 | 1.7 |

| | Neutral resin formulations | | |
|---|---|---|---|
| Material | Resin F, percent | Resin G, percent | Resin H, percent |
| Vinyl chloride________________ | 60.0 | 75.0 | 75.0 |
| Di-n-butyl maleate/fumarate___ | 20.0 | 20.0 | 5.0 |
| 2-ethyl hexyl acrylate_________ | 20.0 | 5.0 | 20.0 |
| Trichloroethylene (as above)___ | 1.7 | 1.7 | 1.7 |

The various resins were made into coating compositions of 20% solids contents by using the following formulation:

| | G. |
|---|---|
| Acidic resin ___________________________________ | 8 |
| Neutral resin __________________________________ | 92 |
| Toluene ______________________________________ | 300 |
| Methyl ethyl ketone ____________________________ | 100 |

The mixed resins were dissolved in the mixed solvents by warming and then filtering. The resulting coatings were coated on primed iron can stock carrying an oleoresinous primer. The topcoats were all applied by roll coating at a rate of 20 mg./4 square inches and were baked 10 minutes at 305° F. The coated stock was cut and formed into can ends and the ends were pasteurized in the conventional pack test conducted for 30 minutes at 150° F. Adhesion was tested before and after pasteurization, and fracture tests were conducted by the copper sulfate procedure. Such and other data are summarized in the following table where 10=excellent and 0=complete failure:

TABLE I

| Test: | Acidic resin | Neutral resin | Initial brightness | Blush resist. | Initial adhesion [1] percent | Loss of— Adhesion [1] after past., percent | Copper sulfate test |
|---|---|---|---|---|---|---|---|
| 1 | A | F | 6 | 6 | 0 | 50 | 7 |
| 2 | B | F | 7 | 5 | 0 | 0 | 8 |
| 3 | C | F | 4 | 5 | 90 | 100 | 7 |
| 4 | D | F | 5 | 5 | 100 | 100 | 8 |
| 5 | E | F | 4 | 5 | 90 | 100 | 8 |
| 6 | A | G | 10 | 6 | 90 | 100 | 7 |
| 7 | B | G | 10 | 6 | 0 | 25 | 7 |
| 8 | C | G | 10 | 8 | 100 | 95 | 9 |
| 9 | D | G | 10 | 7 | 100 | 95 | 8 |
| 10 | E | G | 10 | 7 | 50 | 95 | 8 |
| 11 | A | H | 10 | 8 | 100 | 100 | 9 |
| 12 | B | H | 10 | 8 | 80 | 80 | 9 |
| 13 | C | H | 10 | 8 | 100 | 100 | 9 |
| 14 | D | H | 10 | 10 | 100 | 100 | 10 |
| 15 | E | H | 10 | 8 | 100 | 100 | 10 |

[1] The percentages indicate per cent of test area removed by "Scotch" tape, hence 0%=excellent adhesion. Commercial vinyl resin (control) has initial adhesion loss of 90% and adhesion loss after pasteurization of 95%.

It will be noted that poor adhesion accompanies a low acid content in the acid resin. Other examples supra indicate the beneficial effects of attaining and maintaining acid contents yielding optimum adhesion, e.g., about 5%.

Figure 1:
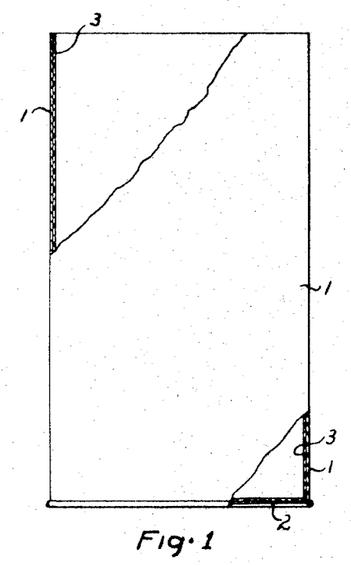
FIG. 1 is an elevational view of a metal beer can with a portion thereof broken away to reveal internal features. The sectioned areas have been exaggerated in their thickness dimensions to better reveal the structure.
Figure 2:
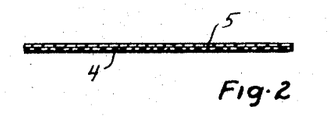
FIG. 2 is a sectional view of the lid, taken on line 2—2 of FIG. 3.
Figure 3:
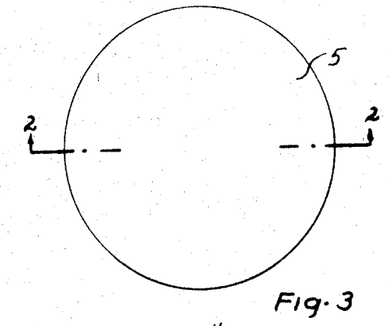
FIG. 3 is a plan view of the lid.
Figure 4:
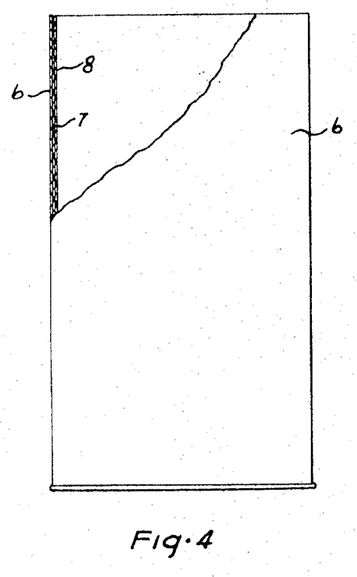
FIG. 4 is an elevational view of metallic food or beverage can similar in structure to that of FIG. 1 but provided internally with two protective films. The sectioned area has been exaggerated in its thickness dimension to better reveal the structure.
Figure 5:
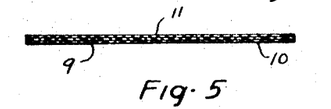
FIG. 5 is a sectional view of a lid similar to that shown in FIGS. 2 and 3 but having two protective coating films applied to the side of the lid which will be in contact with the contents of the can of FIG. 4 when the lid has been crimped to the open end of said can.
Figure 6:
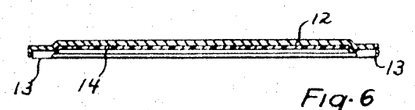
FIG. 7 is a plan view of the lid and FIG. 6 is a sectional view thereof taken on the line 6—6 of FIG. 7, exaggerated in its thickness dimension.
Figure 7:
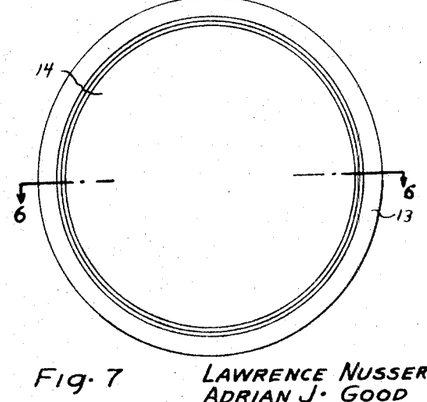

From the foregoing examples and description of our invention, it will be evident that the use of the acidic interpolymers leads to important performance and cost advantages over the vinyl resins heretofore proposed as film-forming components of container coatings, especially when the acidic interpolymers are used in conjunction with neutral interpolymers having the ranges of composition defined hereinabove and in the following claims. Those skilled in the art will recognize the many variations which can be made in blended formulations within the principles of the invention to adapt their resulting coatings to particular uses in the sanitary coating field and to adapt their compositions to the varieties of application techniques which can be employed in that field. It will also be clear that our compositions and processes can be applied to a wide variety of container components such as lids, caps, milk bottle hoods of metallic foil, wrapping foils, cardboard or paper cap and lid inserts, etc. Containers which can be so coated include the conventional cans used for packaging foods and beverages, metal storage tanks or drums, metallic tank cars or trucks, and the like. Representative containers and closures coated in accordance with the invention are illustrated in the attached drawings. FIG. 1 illustrates a metal beer can 1 having a bottom 2 crimped thereto and having a single coating 3 over the entire inner surface of the body and bottom. Said coating represents the baked film secured by spraying the composition of Example 2 on the internal surfaces and then baking the sprayed can to cure the applied coating. FIGS. 2 and 3 illustrate a closure for the can of FIG. 1, adapted to be crimped to the open end of said can after the latter has been filled with beer or other edible food or beverage. It will be seen that the lid is provided with a protective film 4 applied to the metallic substrate 5 of the lid. The film 4 is a baked film like film 3 of the can. FIG. 4 illustrates a metallic food or beverage can 6 having its internal surfaces coated with a priming film 7 such as would be derived from the composition of Example 2, and a top-coat 8 such as would be derived from the composition of Example 1. FIG. 5 represents a companion closure for the can of FIG. 4 adapted to be crimped to the open end of the can and having a priming film 9 and a top coat 10 applied to the metallic substrate 11 of the closure. FIGS. 6 and 7 are sectional and plan views respectively of a lid of the type adapted for use as a closure for home-canning jars. The metallic substrate 12 of the lid is provided with a peripheral ring 13 of rubber-like gasket- or sealing-material, and the remaining area of the under surface of the lid has had applied to it a baked protective film 14 such as would be derived from the composition of Example 2.

The coatings of this invention can, of course, be used as protective coatings on metal articles generally. It will also be understood that the coatings can be used advantageously as linings for containers and/or closures in which non-edible materials are packaged, e.g., detergents and corrosive chemicals such as lye, bleaching powder, household laundry materials, toothpaste, etc.

Having described our invention, what we claim is:

1. Coating compositions adapted for application to the interior of sanitary cans to provide adherent coatings resistant to elevated temperature pasteurizing treatments comprising a solvent medium comprising at least 75% by weight of liquid mononuclear aromatic hydrocarbon solvent and having dissolved therein at least 18% by weight of resin solids constituted by a mixture of copolymer components A and B in a weight ratio of copolymer component A to copolymer component B of from 98/2 to 25/75, copolymer component A being aromatic hydrocarbon-soluble copolymer of 55–75% of vinyl chloride with the balance of the copolymer consisting essentially of di-saturated hydrocarbon di-ester of acid selected from the group consisting of maleic, fumaric and chloromaleic acids and mixtures thereof, said diesters containing 6–24 carbon atoms and said copolymer component A being characterized by complete solubility in toluene at 25% solids and by a relative viscosity measured at 20° C. in 1% cyclohexanone of from 1.3–1.7, and copolymer component B being aromatic hydrocarbon-soluble copolymer of 55–75% of vinyl chloride with 14–35% of di-saturated hydrocarbon di-ester of acid selected from the group consisting of maleic, fumaric and chloromaleic acids and mixtures thereof, said di-esters containing 6–24 carbon atoms and from 5–10% of monohydrogen mono-saturated hydrocarbon ester of acid selected from the group consisting of maleic, fumaric and chloromaleic acids and mixtures thereof, said monoesters containing 5–14 carbon atoms and said copolymer component B being characterized by complete solubility in a 90/10 mixture of toluene and methyl ethyl ketone at 25% solids and by a relative viscosity measured at 20° C in 1% solution in cyclohexanone of from 1.2–1.6.

2. Coating compositions as recited in claim 1 in which the weight ratio of copolymer components A and B is from 95/5 to 50/50.

3. Coating compositions as recited in claim 1 in which said mononuclear aromatic hydrocarbon solvent is toluene.

4. Coating compositions as recited in claim 3 in which said toluene is present in said solvent medium in an amount of at least 90%.

5. Coating compositons as recited in claim 3 in which said copolymer components A and B are dissolved in said solvent medium in an amount of from 20-35% by weight.

6. Coating compositions as recited in claim 1 in which said solvent medium includes up to 25% of active polar solvent selected from the group consisting of acetone, methyl ethyl ketone, methyl isobutyl ketone, cyclohexanone, ethyl butyl ketone, isophorone, diacetone alcohol, ethyl acetate, n-butyl acetate, isobutyl acetate, butyl propionate, tetrahydrofuran, tetrahydropyran, dioxane, propylene carbonate, 2-ethoxy ethanol, 2-ethoxyethyl acetate, 2-nitropropane, nitrobenzene, dimethyl formamide and acetonitrile.

7. Tinplate surfaced with a baked film of the coating compositions recited in claim 1.

8. Primed tinplate surfaced with a baked film of the coating compositions recited in claim 1.

9. Tinplate surfaced with a baked oleoresinous phenol aldehyde varnish primer and overcoated with a baked film of the coating compositions recited in claim 1.

10. A product as recited in claim 9 in which said oleoresinous phenol-aldehyde varnish is constituted by an oil-soluble, non-heat hardening phenol-aldehyde resin heat-bodied with from 6 to 18 gallons of drying oil per 100 pounds of said phenol-aldehyde resin.

11. Coating compositions adapted for application to the interior of sanitary cans to provide adherent coatings resistant to elevated temperature pasteurizing treatments comprising liquid mononuclear aromatic hydrocarbon solvent as essential solvating medium and having dissolved therein at least 18% by weight of resin solids constituted by a mixture of copolymer components A and B in a weight ratio of copolymer component A to copolymer component B of from 98/2 to 25/75, copolymer component A being aromatic hydrocarbon-soluble copolymer of 55-75% of vinyl chloride with the balance of the copolymer consisting essentially of di-saturated hydrocarbon di-ester of acid selected from the group consisting of maleic, fumaric and chloromaleic acids and mixtures thereof, said di-esters containing 6-24 carbon atoms and said copolymer component A being characterized by complete solubility in toluene at 25% solids and by a relative viscosity measured at 20° C. in 1% cyclohexanone of from 1.3-1.7, and copolymer component B being aromatic hydrocarbon-soluble copolymer of 55-75% of vinyl chloride with 14-35% of di-saturated hydrocarbon di-ester of acid selected from the group consisting of maleic, fumaric and chloromaleic acids and mixtures thereof, said di-esters containing 6-24 carbon atoms and from 5-10% of monohydrogen mono-saturated hydrocarbon ester of acid selected from the group consisting of maleic, fumaric and chloromaleic acids and mixtures thereof, said mono-esters containing 5-14 carbon atoms and said copolymer component B being characterized by complete solubility in a 90/10 mixture of toluene and methyl ethyl ketone at 25% solids and by a relative viscosity measured at 20° C. in 1% solution in cyclohexanone of from 1.2-1.6.

12. A sanitary coating composition particularly adapted for coating metallic food and beverage containers, and closures therefore, on an interior surface thereof, said composition comprising a liquid vehicle of organic aromatic solvent as essential solvating medium solution of resinous film-forming binder, the latter being a mixture composed essentially of:

(1) 2-30% by weight of said binder of at least one acidic interpolymer selected from the group consisting of Type B and Type D, both defined thereinafer, and (2) 98-70% by weight of at least one neutral interpolymer selected from the group consisting of Type A and Type C, both defined hereinafter, each of said four types of interpolymers having a relative viscosity between about 1.27 and 1.6 in 1% cyclohexanone solution, and being formulated to 100% from the following kinds and amounts of monomers in percent by weight:

|  | Type A, percent | Type B, percent | Type C, percent | Type D, percent |
|---|---|---|---|---|
| Vinyl chloride | 55-75 | 55-75 | 55-80 | 55-80 |
| Di-esters of at least one dicarboxylic acid selected from the group consisting of maleic acid, chloromaleic acid, and fumaric acid, each alcohol radical of said diesters being an alkyl radical of 1-10 carbon atoms substantially free of ethylenic unsaturation | 25-45 | 14-35 | 3-23 | 3-17 |
| Monoesters of at least one dicarboxylic acid selected from the group consisting of maleic acid, chloromaleic acid, and fumaric acid, each alcohol radical of said diesters being an alkyl radical of 1-10 carbon atoms substantially free of ethylenic unsaturation | None | 2-10 | None | 1-10 |
| Alkyl esters of at least one monocarboxylic acid selected from the group consisting of acrylic acid and methacrylic acid, each alcohol radical of said esters being an alkyl group of 1-10 carbon atoms substantially free of ethylenic unsaturation | None | None | 1-22 | 1-18 |

13. A coating composition as claimed in claim 12 wherein halogenated unsaturated hydrocarbons selected from the group consisting of cis- and trans- 1,2-dichloroethylene, cis- and trans- 1,2-dibromoethylene, 1,1-dichloro-2-bromoethylene, allyl chloride, methallyl chloride, allyl bromide, allyl iodide, methallyl bromide, methallyl iodide, 2,3-dibromo-1-propene, 3,3-dichloro-1-propene, 2,3 - dibromo - 1 - propene, 1 - chloro - 2-butene, 1-chloro-2-decene and 1-chloro-2-octadecene are included with said monomers in the amount of 1-6.5% by weight, based on 100 parts of mixed monomers.

14. A coating composition as claimed in claim 12 wherein the interpolymers have a relative viscosity in 1% cyclohexanone solution between about 1.3 and 1.5.

15. A coating composition as claimed in claim 12 wherein the interpolymers have the following preferred limits on formulation in percent by weight:

|  | Type A, percent | Type B, percent | Type C, percent | Type D, percent |
|---|---|---|---|---|
| Vinyl chloride | 67-73 | 67-73 | 67-75 | 67-75 |
| Diesters as defined in claim 14 | 27-33 | 19-28 | 6-20 | 6-15 |
| Monoesters as defined in claim 14 | None | 2-8 | None | 2-8 |
| Alkyl esters as defined in claim 14 | None | None | 6-20 | 7-17 |

16. A coating composition as claimed in claim 15 wherein said organic solvent solution of resinous film-forming binder comprises a major amount of aromatic hydrocarbon solvent and a small amount up to about 10% of oxygenated aliphatic solvent selected from the group consisting of monohydric alkanols having up to 8 carbons, monoalkylene glycol monoethers of monohydric alkanols having up to 8 carbons in each alcohol radical thereof, and di-alkylene glycol monoethers of monohydric alkanols having up to 8 carbons in each alcohol radical thereof.

17. A coating composition as claimed in claim 16 wherein the composition includes up to about 1% of non-film-forming 1,2-epoxy compound selected from the group consisting of ethylene oxide, propylene oxide, phenoxypropylene oxide, epichlorhydrin, phenyl glycidyl ether and diallyl ether monoxide.

18. A coating composition as claimed in claim 14 wherein the composition includes up to about 1% of non-film-forming, 1,2-epoxy compound selected from the group consisting of ethylene oxide, propylene oxide, phenoxypropylene oxide, epichlorhydrin, phenyl glycidyl ether and diallyl ether monoxide.

19. A coating composition as claimed in claim 12 wherein the composition includes up to about 1% of non-film-forming 1,2-epoxy compound selected from the group consisting of ethylene oxide, propylene oxide, phenoxypropylene oxide, epichlorhydrin, phenyl glycidyl ether and diallyl ether monoxide.

20. A coating composition as claimed in claim 12 wherein said organic solvent solution of resinous film-forming binder comprises a major amount of aromatic hydrocarbon solvent and a small amount up to about 10% of oxygenated aliphatic solvent selected from the group consisting of monohydric alkanols having up to 8 carbons, monoalkylene glycol-monoethers of monohydric alkanols having up to 8 carbons in each alcohol radical thereof, and di-alkylene glycol monoethers of monohydric alkanols having up to 8 carbons in each alcohol radical thereof.

21. A container having interior metallic surfaces adapted to contact food and other edible material packaged in said container, said interior metallic surfaces being coated with an edible-material-contacting baked film of the coating composition of claim 12.

22. A container having interior metallic surfaces adapted to contact food and other edible material packaged in said container, said interior metallic surfaces being coated with an edible-material-contacting baked film of the coating composition of claim 13.

23. A container having interior metallic surfaces adapted to contact food and other edible material packaged in said container, said interior metallic surfaces being coated with an edible-material-contacting baked film of the coating composition of claim 14.

24. A container having interior metallic surfaces adapted to contact food and other edible material packaged in said container, said interior metallic surfaces being coated with an edible-material-contacting baked film of the coating composition of claim 15.

25. A container having interior metallic surfaces adapted to contact food and other edible material packaged in said container, said interior metallic surfaces being coated with an edible-material-contacting baked film of the coating composition of claim 16.

26. A container having interior metallic surfaces adapted to contact food and other edible material packaged in said container, said interior metallic surfaces being coated with an edible-material-contacting baked film of the coating composition of claim 17.

27. A coating composition as claimed in claim 12 wherein trichloroethylene is included with said monomers in the amount of 1.5–6.5% by weight, based on 100 parts of mixed monomers.

28. A coating composition as claimed in claim 12 wherein halogenated aliphatic saturated hydrocarbons containing up to 16 carbon atoms and containing up to 5 halogen atoms selected from the group consisting of fluorine, bromine and iodine, are included with said monomers in an amount of 1–6.5% by weight, based on 100 parts of mixed monomers.

References Cited

UNITED STATES PATENTS

| | | | |
|---|---|---|---|
| Re. 24,206 | 8/1956 | Rowland et al. | 260—78 |
| 3,119,712 | 1/1964 | Esswein | 260—899 |
| 2,849,422 | 8/1958 | Rowland et al. | 260—78.5 |
| 2,941,974 | 6/1960 | Reymann et al. | 260—899 |
| 2,979,480 | 4/1961 | Piloni et al. | 260—78.5 |

MORRIS LIEBMAN, Primary Examiner

L. T. JACOBS, Assistant Examiner.

U.S. Cl. X.R.

117—75, 132; 260—899, 901, 31.2, 32.8 33.4